March 29, 1960
A. C. RUGE
2,930,943
APPARATUS FOR AUTOMATICALLY CLASSIFYING
ACCORDING TO PREDETERMINED CONDITIONS
Filed June 11, 1953
2 Sheets-Sheet 1
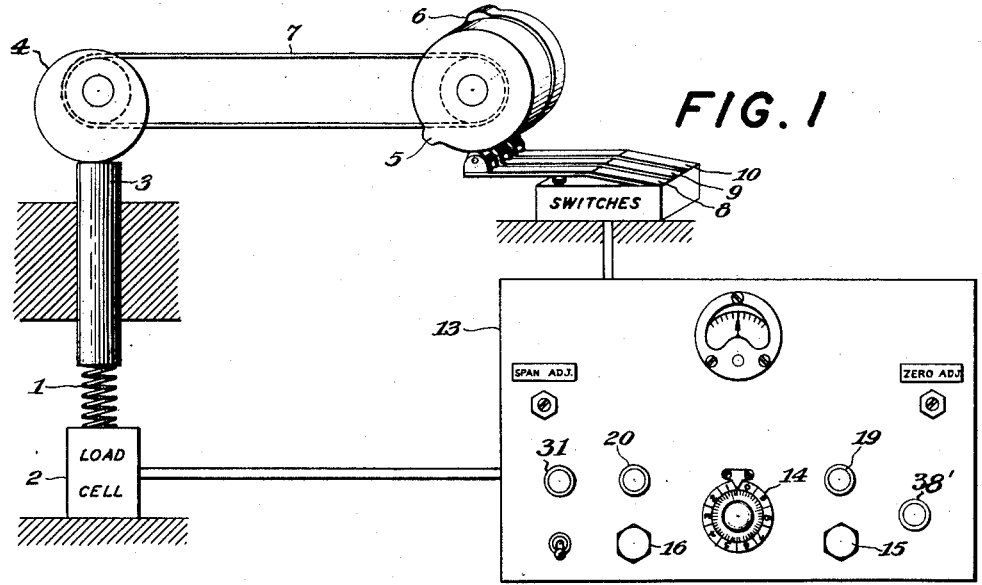
FIG. 1
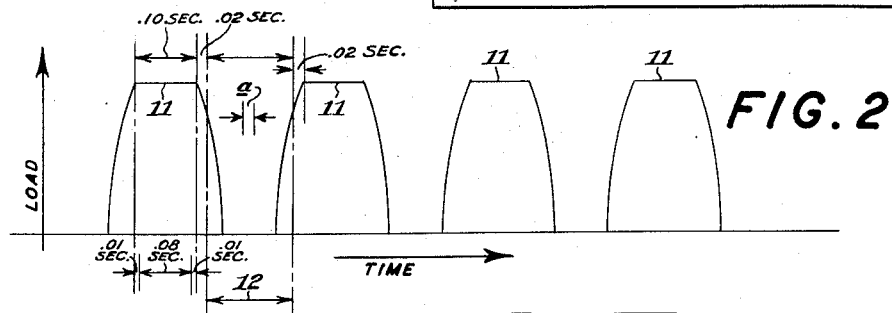
FIG. 2
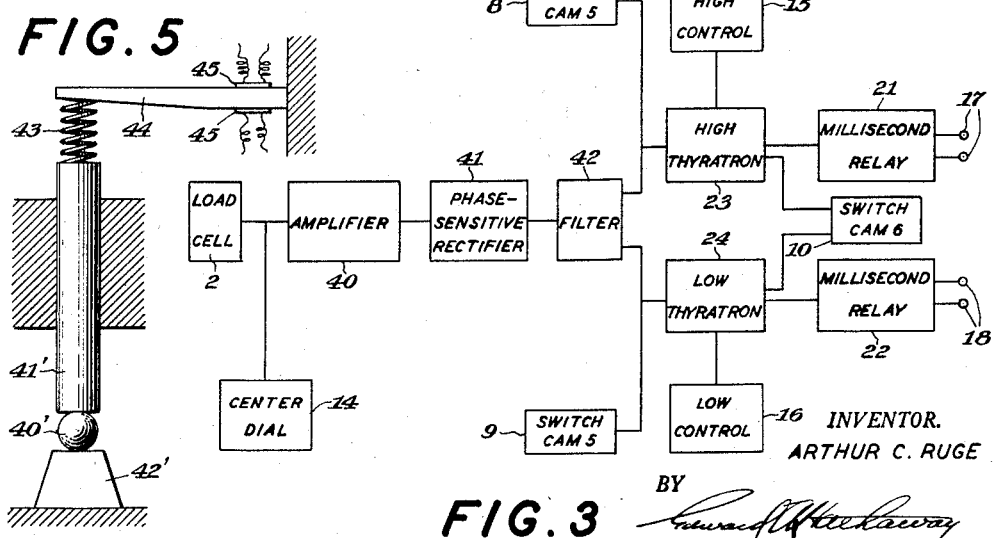
FIG. 5
FIG. 3
INVENTOR.
ARTHUR C. RUGE
BY
ATTORNEY INVENTOR.
ARTHUR C. RUGE
BY
Edward V. Hathaway
ATTORNEY

United States Patent Office

2,930,943
Patented Mar. 29, 1960

2,930,943

APPARATUS FOR AUTOMATICALLY CLASSIFYING ACCORDING TO PREDETERMINED CONDITIONS

Arthur C. Ruge, Cambridge, Mass., assignor to Baldwin-Lima-Hamilton Corporation, a corporation of Pennsylvania Application June 11, 1953, Serial No. 360,924

16 Claims. (Cl. 317—149)

This invention relates generally to force measuring devices and particularly to an automatic spring tester and classifier.

It is an object of my invention to provide improved automatic electrical means for the rapid testing of springs to determine rapidly and accurately whether or not the stiffness of a given spring lies within predetermined limits and, if not, to classify the spring as either too high or too low in stiffness.

Although many spring testing devices have been designed and constructed in the past, it is a characteristic of my present invention that the classifying is entirely electrical and electronic and that the sensing of the spring characteristic is done by electrical means, thus avoiding the use of mechanisms which would slow down the classifying process.

Therefore, in this invention the speed of testing springs is limited only by the mechanical problems related to the physical handling and loading of the springs rather than by limitations of the sensing and measuring system as is the case with former testing systems.

Other objects and advantages will be more apparent to those skilled in the art from the following description of the accompanying drawings in which:

Fig. 1 is a schematic drawing of the general arrangement of my invention;

Fig. 2 is a diagrammatic drawing showing a "load versus time" pattern;

Fig. 3 is a block diagram showing the operation of the spring tester and classifier;

Fig. 5 is a schematic illustration of a modification of the device.

Figure 4:
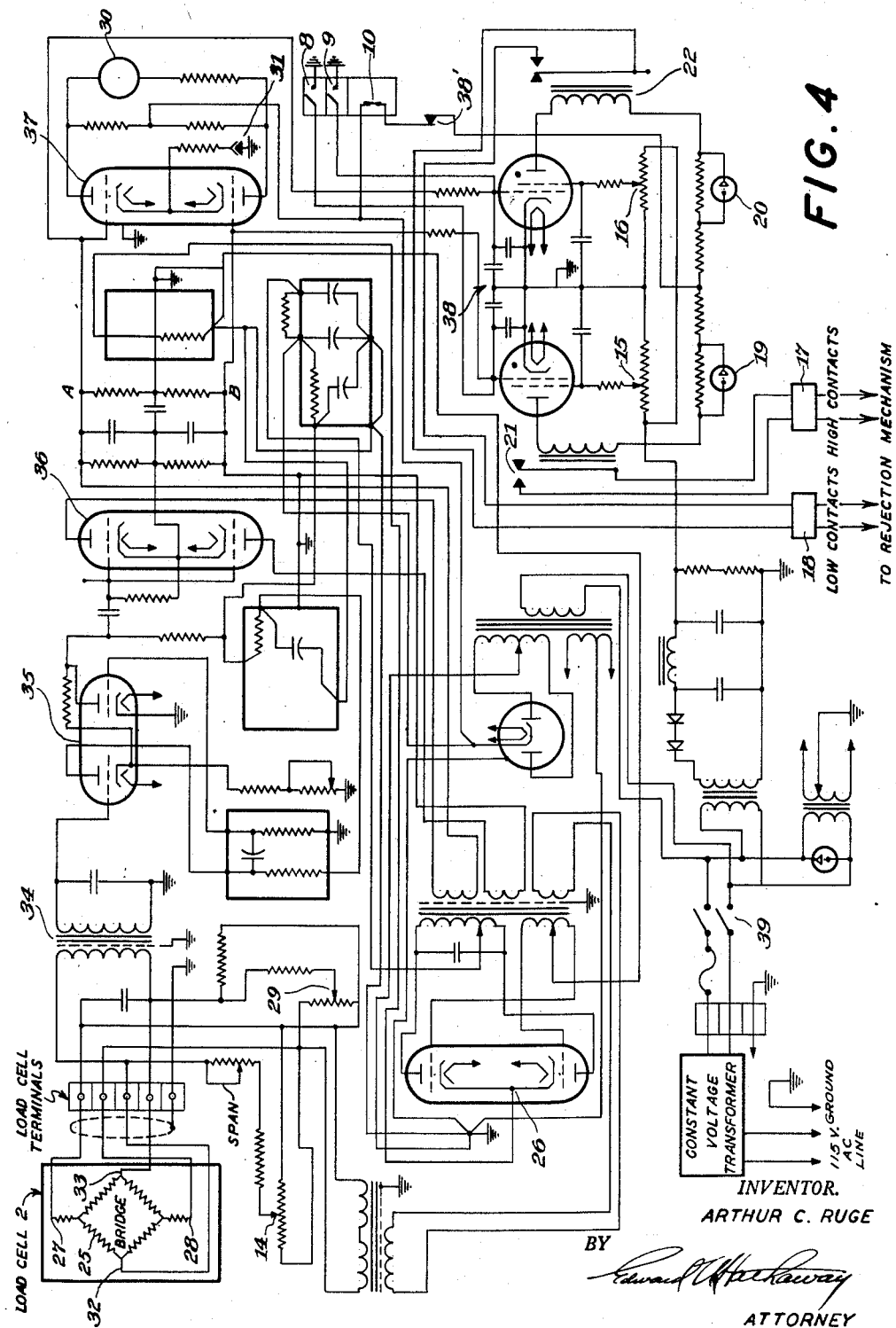
Fig. 4 is a diagram of the electric and electronic circuit of the device.

The principle of this invention is best illustrated by reference to Figs. 1, 2, and 3. Fig. 1 shows an arrangement, embodying the present invention, reduced to schematic form for purposes of explanation. Spring 1 to be tested and classified is inserted between a load sensing device 2 and a loading plunger 3 which is reciprocated by cam or other means 4. The load sensing device is any type of load cell which responds continuously and electrically to the applied load which is the condition to be classified according to its magnitude during a predetermined portion of the classifying cycle. Specifically, a preferred type of load cell would be the bonded wire strain gage type since it is simple in operation, very rigid, and since it has no mechanically moving parts to wear or get out of order. One form of such a cell is shown in my Patent No. 2,472,047. Furthermore, the bonded wire strain gage type of load cell has the advantage of being a simple resistance change device so that it can be operated with either D.C. or A.C. excitation to suit the convenience of the designer of the instrumentation. Many other types of cells will do as well. For example, unbonded wire strain gage cells, variable reluctance types, magnetic strain gage cells, etc., so long as they meet the one criterion that the response can be converted into electrical voltage or current which is continuously responsive to applied load over the region of load to be covered by the classifying action of the testing device. Thus, even a hydraulic type of load cell as shown in my said patent can be adapted provided the hydraulic pressure is converted to electrical intelligence as might be done, for example, by means of a strain gage type fluid pressure cell, or a Bourdon gage can be connected to the hydraulic chamber and made to operate an electrical gage such as a differential transformer, etc.

It is seen that we have here a means to support the spring under test on a device responsive to the spring load, and means for deforming the spring by a predetermined amount. In testing springs of a given batch it may be seen that under these conditions the load acting on the load cell when the spring is at maximum deformation is a precise measure of spring stiffness, provided the springs are all of equal free height. Or, regardless of the free heights of the springs, so long as they are all deformed by a predetermined amount, then the change in load is a true measure of spring stiffness.

A very common spring stiffness specification is that employed in the automotive trade for clutch and valve springs. For such springs the common specification is expressed in terms of the allowable load limits to which the spring must conform when it is compressed to a specified height. A typical automobile valve spring specification would call for load limits of 165 and 175 pounds when the spring is compressed to a height of 1.500 inches. Or, the specification may be written as 170±5 pounds at 1.500 inches. The arrangement shown in Fig. 1 is especially well suited for working with this type of specification, although it can readily be adapted to take care of other stiffness specifications, as will be seen from the following description.

It will be appreciated that a spring manufacturer when working to such specifications must maintain close control over his manufacturing operation. Ideally, he would test each individual spring by means of a device which gives the highest possible accuracy with the result that a maximum number of produced springs would be accepted by the customer who also normally tests the springs to see that they meet his specifications. If the manufacturer tests only samples of his production or if he employs a testing device of low accuracy he will have to work to much closer than specified tolerances if he wishes to avoid a serious customer rejection rate. It will be seen, therefore, that the ideal device must be very fast in its action in order to make it practical to test all the springs produced and, at the same time, it must be very accurate in order to allow the manufacturer to make use of the full tolerance which has been allowed him. My present invention fulfills these two requirements to an extent never before achieved in spring testing equipment. Actual tests show that the device described herein can easily classify springs at a testing rate of several springs per second to an accuracy of ±¼ pound in a 300 pound capacity tester. In fact, the speed limitation up to the date of writing has been determined solely by mechanical problems related to the physical handling and loading of the springs.

Again referring to Fig. 1, a suitably shaped cam 4 serves to operate loading plunger 3 so as to produce a load versus time pattern such as that shown in Fig. 2. Preferably, the loading arrangement is so made that there is a "dwell" period 11 in each loading cycle, during which period the load remains substantially constant. In certain equipment which has been built in accordance with this invention this dwell time was made about 0.1 second or a little greater, although the system will work even though there is no true dwell period at all, the device merely catching the loads "on the fly."

Operating synchronously with the rotation of loading cam 4 are cams 5 and 6, shown here as connected through a belt 7. Cams 5 and 6, whose angular timing relation to each other may be suitably varied, operate switches 8, 9, and 10 which serve to tell the spring measuring circuit when to make its observation and when to reset itself for the next operation. Cam 5 operates switches 8 and 9 while cam 6 operates switch 10. Assume the cycle is started with the loading plunger at the bottom of its stroke where it dwells for approximately 1/10 second in order to permit measurement. Cam 5 which is associated with switches 8 and 9 actuates them approximately 1/100 of a second after the start of the dwell period and releases them approximately 1/100 of a second before the end of the dwell period. In other words, the time during which switches 8 and 9 are actuated provides intelligence as to when it is safe to make the load measurement. During the period established by the action of cam 5 on switches 8 and 9 the electronic circuit "looks at" the load and decides if it is within the tolerance span and, if not, classifies it as to high or low, representing respectively that the load is above or below the tolerance span.

Fig. 3 shows by means of a block diagram how the device functions. The load cell output, after being adjusted by means of a "center dial" 14 is fed into an amplifier. In the preferred form of the invention the load cell output is in the nature of an A.C. voltage proportional to applied load. The center dial 14 is preferably used to suppress the zero of the load cell by an amount equal to the nominal or center value of load for the type of spring being tested. In the example given above, the center dial would be set so that the signal reaching the amplifier is zero for a load of 170 pounds, with the result that a deviation from the center value of 170 pounds in either direction will cause the circuit to react. Following the amplifier stage 40 there is a phase-sensitive rectifier 41 which enables the system to determine if the deviation from the center load is high or low. Next comes a filter stage 42 which smoothes the A.C. pulsations so that a D.C. voltage is obtained the polarity of which depends upon whether the load is greater or less than the center value. By means of a simple resistor network, this D.C. voltage is divided into two parts, one part serving to act upon the high thyratron 23 and the other upon the low thyratron 24, the polarities being so arranged that only one or the other thyratron will fire depending upon the magnitude and direction of the deviation from center load value. The high and low thyratrons are provided with biasing controls 15 and 16 acting upon their screen grids so that their points of firing can be adjusted to predetermined limits based upon specifications. Thus, control dials 14, 15, and 16 together with the associated circuitry of Fig. 4 comprise continuously adjustable means for electrically presetting a predetermined magnitude of the condition (load) which is to be classified according to its magnitude during a predetermined portion of the classifying cycle. In series with each thyratron is a fast-acting relay 21, 22 whose contacts are preferably normally open. When one of the thyratrons fires the associated relay closes in less than 1/100 of a second and causes a corresponding respective rejection or classifying mechanism to operate. The rejection mechanism may, for example, be a gate which by-passes the spring into a high or low bin while allowing the acceptable springs to pass onto an acceptance bin.

Consider now an in-tolerance spring going through a cycle. It may be seen that if the controls have been properly set nothing will happen so far as the rejection contacts are concerned. The amplifier and succeeding network will have merely "looked at" whatever deviation from center load there may have been, but if it did not exceed the preset limits the rejection controls would not be operated. Therefore, the entire system would be ready for the next spring immediately.

If, on the other hand, a spring comes along which is out of tolerance in one direction or the other, one of the thyratrons will fire during the dwell period, having received its permission to fire from switch 8 or 9 actuated from cam 5 during the dwell period. Either the high or low rejection contact will therefore close and, if nothing more were done the circuit would remain in this condition. It is therefore necessary to reset the system before the next spring is ready for measurement. To do this switch 10 operated by cam 6 must be actuated some time before the start of the next dwell period. In the particular circuit to be described below, it would be necessary for switch 10 to open for at least 1/50 of a second *a* somewhere during the interval 12 shown in Fig. 2 in order to give sufficient time for the resetting operation which is largely controlled by the operating time of the rejection or classifying relays. In Fig. 1 the control panel of the classifying instrument is indicated at 13. Center dial 14 is preferably calibrated to read directly in terms of spring load for convenience in setting up the device. The high and low controls are indicated as 15 and 16 respectively. High and low contacts 17 and 18 provide means to control whatever rejection or marking or classifying system the testing operation calls for. For example instead of operating rejection gates these controls can actuate devices which mark the spring such as by spraying or printing a suitably colored mark to represent high or low. For the convenience of the operator in setting up, high and low signal lights 19 and 20 are provided to give visual indication of firing of the respective thyratrons.

The time actually required for the system to classify a spring is dependent within limits upon the extent to which the tolerance is exceeded. For example, in the specific system described below, if a spring is 1/3 pound outside of tolerance, the time required for the relay to close, starting from the time at which switches 8 and 9 are open, is .07 second or less. For springs further outside of tolerance, the time required is even less. This is because the time required to fire thyratrons 23 and 24 is dependent upon the time required to build up the necessary firing signal through the amplifier, phase-sensitive rectifier, and filter. The larger the out-of-tolerance signal is, the quicker the firing signal will be reached. The time lost in firing the thyratron is extremely small, but another appreciable delay occurs in millisecond relays 21 and 22.

We now proceed to examine a specific circuit arrangement which has been found to be effective, Fig. 4. This illustration is given for purposes of fuller explanation and does not in any way limit the usefulness of the invention to any particular circuit arrangement such as that shown here. Load cell 2 in this case is indicated as a resistive bridge network 25 as used in load cells of the general type shown in Patent No. 2,472,047. Oscillator 26 serves to apply an A.C. voltage across terminals 27 and 28 of load cell 2 to energize the bridge. In an actual embodiment which has been used, the load cell circuit comprises a 240 ohm bridge and the voltage across terminals 27 and 28 is 10 volts at 1000 cycle A.C. The center dial 14 is seen to be a zero suppression adjustment acting on bridge circuit 25. An additional zero adjustment 29 is provided so that the center dial can be set to read directly the true load on the cell to a calibrated scale. Zero adjustment 29 is used as follows: With no load on the load cell, center dial 14 is set to read zero. The zero adjustment 29 is then operated to the point where load cell bridge 25 is balanced, as indicated by insertion of a suitable meter at 30 in Fig. 4. For making this adjustment, the meter 30 is put into the circuit by actuating push button 31. Having made this zero adjustment, the center dial may be set to read the desired center load in pounds by use of its calibrated scale.

It is seen that when the center dial is set to the proper value the zero point of bridge 25 is suppressed so that the bridge is unbalanced at the no load condition and becomes balanced only when the preset center load is applied to the cell. The unbalanced voltage appearing across terminals 32 and 33 is carried across coupling transformer 34 and through amplifying stages 35, 36 and 37. Stage 36 is a phase detecting stage in addition to being an amplifying stage. The plates of this stage are fed from the same A.C. voltage supply which feeds bridge 2, the polarities being such that half of the stage is conductive during half a cycle of the A.C. voltage while the other half of the stage is conductive during the remaining half of a cycle. The result of the phase-sensitive detector 36 is that a rectified voltage appears at points A and B relative to ground, the polarity depending on whether the load on cell 2 is greater or less than the preset load on the center dial 14. The resistor network between points A and B merely divides the rectified voltage into two parts. If the load on cell 2 exceeds the center value, the voltage at point A becomes positive relative to ground by an amount proportional to the excess load while point B becomes negative by an equal amount. If the load is less than the center value the situation is reversed, with point A becoming negative and point B becoming positive. The voltage thus developed at A and B is carried through a filter network indicated generally at 38 to provide smoothed D.C. voltage, point A being connected through the filter network to the control grid of one thyratron while point B is connected through the filter network to the control grid of a second thyratron.

The thyratrons are biased by adjustable negative voltages on their screen grids by adjustments 15 and 16 so that a definite positive voltage, whose magnitude is determined by the screen grid voltage, is required in order to make the thyratrons fire. Then, if the load on cell 2 deviates from the center value by an amount great enough to produce the necessary control grid voltage, the thyratron whose grid becomes positive will fire, while the other thyratron is biased out even further and will not fire. It is therefore seen that the matter of which thyratron fires is determined solely by whether the load is greater or less than the center value by an amount determined by biasing controls 15 and 16.

In series with each thyratron is a fast acting relay 21, 22 whose contacts are normally open. When one of the thyratrons fires the corresponding relay closes in less than 1/100 of a second, thus providing means to operate a rejection mechanism or any other device for identifying the classification of the spring which has been tested. At the same time, corresponding signal lights 19, 20 will light on the panel to show the operator what action has taken place.

Since, as explained earlier, it is necessary to restrict the interval during which the circuit "sees" the action of the spring, switches 8 and 9 are made to open only during the dwell period, being closed at all other times thereby shorting the grids of the thyratrons to ground, thus preventing them from firing.

Furthermore, since it is necessary to reset the system if a thyratron has fired during a testing cycle, a switch 10 which is normally closed is momentarily opened by cam 6 at a suitable interval before the start of the next dwell period.

As a convenience during the set-up operation, a manual push button reset 38' is provided on the panel of the measuring instrument. Amplifier stage 37 is used merely to operate meter 30 which is located on the operating panel as a convenience for the set-up operation. If meter push button 31 is depressed, meter 30 will read zero when no signal appears across terminals 32 and 33 of load cell bridge 25.

The set-up operation is as follows: With the power switch 39, Fig. 4, turned on and the vacuum tubes suitably warmed up, the center dial is set at zero. With no load on the load cell (except the weight of the spring if the system is in a vertical plane), zero adjustment 29 is used to bring meter 30 to read zero, push button 31 being depressed during this operation.

The center dial is now set to read the desired nominal or center load value. For example, if the spring is specified as 170±5 pounds at test height the center dial would be set to read 170 pounds. The cell bridge circuit now has its zero suppressed so that it will require 170 pound load to bring it to a balanced condition.

The next step is to set the high and low balancing controls to the desired value, in the example cited this would be 5 pounds high and 5 pounds low. This can be done by calibrating the high and low controls to read directly in pounds. However, for best accuracy I prefer to follow a different procedure since I wish to be able to replace any tubes in the circuit including thyratrons and also to allow for aging with time and still not upset the accuracy of my system. Therefore, I prefer the following method of setting these controls.

I apply a load exactly equal to the low limit in the spring specification, in the example cited 165 pounds, to the load cell 2 of Fig. 4. This can be done by using a carefully tested master spring or by any other means such as dead weight loading. This low control is slowly turned from its minimum setting until the neon light 20 just fires under the applied load.

Then, I apply a load on the cell equal to the high limit of the spring and adjust the high control at its maximum value until its neon light just fires.

During the course of these limit adjustments, I use manual reset switch 38' whenever it is necessary or desired to clear the system in order to determine just when the thyratrons will be on the verge of firing. The system is now ready for use. From this point on, its action will be entirely automatic.

While the springs can be fed into the loading arrangement by hand and rejected or classified manually by observing the action of the high and low signals 19 and 20, it is preferable for reasons of economy and speed to make the entire system automatic, the springs being fed mechanically and in synchronism with the action of the loading system and, after testing, the springs automatically progress until they fall into any of three classified bins, depending upon whether they are high, low, or in tolerance, their travel to the proper bin being controlled by the action of the classifying instrument. Such automatic handling equipment being commonly used in industry and not being part of this invention per se, it will not be described here in further detail.

It will be seen that I have provided an automatic classifying device which is at once capable of both high speed operation and a high degree of accuracy and repeatability. While I have described it as a classifying device for spring testing, it may be seen that its use is by no means limited to such application. For example, I could equally well apply it to the classifying and sorting of weights of packages passing over a load cell which might be part of a conveyor system. This application is essentially the same as that of spring testing since it is merely classification of a force of one form or another.

Another useful application would be to the rapid gaging of size as illustrated schematically in Fig. 5. The corresponding problem is to size gage parts or pieces 40' which are introduced between anvil 42 and engaging member 41' which may be a guided plunger for purposes of illustration of the principle. Now, whereas most size gaging devices in use today are in the nature of "comparators" the application of my present invention to size gaging extends far beyond the comparator principle although it can also be used as a comparator when desired.

Suppose piece 40' to be gaged may have a size anywhere from ⅛ inch to one inch in the course of normal use of the machine, and suppose that at a given time it is desired to classify a batch of pieces having a nominal size of .500 inch with a tolerance of ±.002 inch. This means that I have to provide for a wide range of sizes and still be able to select any given size to close tolerance. In order to do this, I convert the size measurement by way of example into deflection of an elastic motion-sensing device comprising spring 43 and cantilever beam member 44 on which are mounted strain gages 45 which sense the bending of the beam. Although many other arrangements are possible, this one serves to illustrate the principle very well. It is seen that by proper choice of spring 43 and beam 44 I can accommodate any practical range of motion of plunger 41' and convert it into electrical changes in strain gages 45 which would correspond to the load cell strain gages of bridge 25 in Fig. 4.

The operation would be very much the same as in the case of the spring tester. First, with plunger 41' in its lowest or "zero" position (which may or may not be in contact with anvil 42' depending upon the range of sizes to be handled by the machine), the center dial is set to read zero and the zero adjustment 29 of Fig. 4 is set so as to make meter 30 read zero. Now, following the example just given for purpose of illustration, the center dial would be set to read 0.500 inch and the high and low controls would be adjusted so that the corresponding thyratrons would fire for over or under-size exceeding 0.002 inch. Sequence controls corresponding to switches 8, 9, 10 on Fig. 4 would be provided to perform entirely analogous functions in the size gaging operation.

Thus it is seen that I have provided means for a high speed automatic gaging operation which can be set up to perform an accurate classifying function by controls which are purely electrical in nature and which can cover a large range of sizes and size tolerances. This is in marked contrast to conventional size gaging devices which are used for classifying purposes and which fall under the three general classifications of (1) go-no-go gages, (2) micrometer screw gaging devices and (3) comparator gaging devices. It will be seen that my arrangement combines the functions of all three and, indeed, can be used to perform the function of any one of them alone. Further, it does all this with a simplicity of operation combined with high speed and high accuracy of classification which is not achieved by other devices.

These illustrations will serve to show the broad usefulness of my invention. Many further applications will be obvious to those skilled in the art, such as precision temperature classification or control as might be accomplished by making one or more arms of bridge 25 in Fig. 4 resistively responsive to temperature.

Many variations are possible without deviating from Fig. 3 of the invention. For example, while I have shown in Fig. 4 a circuit operating on A.C. excitation of the bridge, it will be obvious to those skilled in the art that I could just as well employ D.C. excitation. Further, it is obvious that I may not even require electronic amplification or thyratrons if my signal source is sufficiently great to operate relays directly since the entire operation of the circuit shown in Fig. 4 is nothing more than relay action.

Another important variation would be the employment of a multiplicity of classifying devices each adjustable in its operating limit so that the classifying action is not limited to just one or two points. Reference to Fig. 4 will make it clear that I could have employed a multiplicity of thyratrons, all acted upon by the filtered voltage coming from point A and B but with each thyratron having its own biasing control and output relays and/or signal lights. With such an arrangement the device can be used to obtain statistical information on the accuracy of a finished product coming off the production line. Or, it can be used to perform a sorting operation as in sorting bearing balls or rollers into close tolerance categories so that they may be assembled into bearings all having the same size balls or rollers within allowable tolerance. If the purpose is to gain purely statistical information, the thyratrons can be made to operate simple counters which would show the number of pieces in a run which fall within each tolerance category.

For statistical purposes the thyratrons could each operate their individual counters and the numbers appearing on the counters at the end of a run would give directly a statistical picture of the product. This is because all of the pieces passing through which are larger than the first tolerance bracket will cause the first tube to fire for each piece. Those larger than the second tolerance bracket will cause the first and second tube to fire for each piece, and so on.

If a sorting operation is required of the device it is a simple matter to arrange the circuit so that the highest high or the lowest low thyratron dominates and only it operates its rejection or signal control.

It will, of course, be understood that various changes in details of construction and arrangement of parts may be made by those skilled in the art without departing from the spirit of the invention as set forth in the appended claims.

I claim:

1. Apparatus for cyclically classifying a condition according to its magnitude comprising, in combination, means continuously and electrically responsive to the condition over a required range of classification, sequencing means to electrically cause the classifying function to take place only during a predetermined portion of the classifying cycle, continuously adjustable means for electrically pre-setting a predetermined magnitude of the condition, means electrically responsive to both said continuously and electrically responsive means and said pre-setting means so that a classifying indication is produced and stored if said condition differs from the pre-set magnitude in a predetermined direction during the portion of the classifying cycle controlled by said sequencing means, and a second sequencing means for electrically removing said stored classifying indication before the next classifying cycle begins thereby to reset the apparatus, said means which is continuously and electrically responsive to the condition comprises an electrical impedance bridge circuit in which the impedance of at least one arm is responsive to the magnitude of the condition of the article, and the continuously adjusting means for electrically pre-setting a predetermined magnitude of the condition comprises means for producing a voltage signal opposite to that produced by the condition of the article so that the sum of the two voltages will be substantially zero when the condition has a predetermined magnitude, and said means which is electrically responsive to both said continuously and electrically responsive means and said pre-setting means comprises relay means actuated by the said sum of the two voltages, said relay means remaining actuated until re-set by the action of said second sequencing means.

2. The combination set forth in claim 1 further characterized in that two continuously adjustable means are provided for electrically pre-setting different predetermined magnitudes of the condition, one being of a high limit and the other a low limit, and means electrically responsive to both of said pre-setting means and to said continuously and electrically responsive means so that one classifying indication is produced and stored if the condition exceeds the higher pre-set value and another classifying indication is produced and stored if the condition is smaller than the lower pre-set value.

3. The combination set forth in claim 2 further characterized in that three additional continuously adjustable pre-setting means are provided, one for setting a nominal value somewhere between the high and low limits and the other two for setting differences between the nominal value and the respective limits.

4. The combination set forth in claim 1 further characterized in that the continuously adjustable means comprises two separately adjustable means, one for pre-setting the nominal value of the condition, and the second for pre-setting the difference between said nominal value and the predetermined magnitude to be used for classifying.

5. The combination set forth in claim 1 further characterized in that there is provided a multiplicity of continuously adjustable pre-setting means, and a multiplicity of means electrically responsive to both said continuously and electrically responsive means and to said pre-setting means so that corresponding classifying indications are produced and stored if the condition differs from the respective pre-set magnitudes.

6. Apparatus for cyclically classifying springs according to the magnitude of load required to effect a predetermined deflection of a given spring comprising, in combination, means for applying a predetermined deflection to said given spring, means continuously and electrically responsive to the load condition of such spring over a required range of the load classification, sequencing means to electrically cause the load classifying function to take place only during a predetermined portion of the classifying cycle, continuously adjustable means for electrically pre-setting a predetermined magnitude of said deflection load, means electrically responsive to both said continuously and electrically responsive means and to said pre-setting means so that a load classifying indication is produced and stored if the said deflection load differs from the pre-set magnitude in a predetermined direction during the portion of the classifying cycle controlled by said sequencing means, and a second sequencing means for electrically removing said stored classifying indication before the next classifying cycle begins thereby to reset the apparatus, said means which is continuously and electrically responsive to said load condition comprises an electrical impedance bridge circuit in which the impedance of at least one arm is responsive to the load condition, and the continuously adjusting means for electrically pre-setting said predetermined load magnitude comprises means for producing a voltage signal opposite to that produced by said load condition so that the sum of the two voltages will be substantially zero when said deflection load condition has a predetermined magnitude, and said means which is electrically responsive to both said continuously and electrically responsive means and to said pre-setting means comprises relay means actuated by the said sum of the two voltages, said relay means remaining actuated until re-set by the action of said sequencing means.

7. The combination set forth in claim 6 further characterized in that two continuously adjustable means are provided for electrically pre-setting different predetermined magnitudes of the load, one being a high limit and one being a low limit, and means electrically responsive to both of the pre-setting means and to said continuously and electrically responsive means so that one classifying indication is produced and stored if the actual load on the spring under test exceeds the higher pre-set value and another classifying indication is produced and stored if the actual load on the spring is smaller than the lower pre-set value.

8. The combination set forth in claim 6 further characterized in that the continuously adjustable means comprises two separately adjustable means, one for pre-setting a nominal value of the load on the spring under test, and the second for pre-setting the difference between said nominal value and the predetermined magnitude of load to be used for classifying.

9. The combination set forth in claim 6 further characterized in that three additional continuously adjustable pre-setting means are provided, one for setting a nominal value somewhere between the high and low limits and the other two for setting differences between the nominal value and the respective limits.

10. The combination set forth in claim 6 further characterized in that there is provided a multiplicity of continuously adjustable pre-setting means, and a multiplicity of means electrically responsive to both said continuously and electrically responsive means and to said pre-setting means so that corresponding classifying indications are produced and stored if the condition differs from the respective pre-set magnitudes.

11. In a size gaging device for cyclically classifying articles according to their size comprising, in combination, means including two parts for engaging the article for size gaging it, at least one of said engaging parts being adapted to accommodate a required range of sizes, means continuously and electrically responsive to the relative position of the two parts of said engaging means, sequencing means to electrically cause the size classifying function to take place only during a predetermined portion of the classifying cycle, continuously adjustable means for electrically pre-setting a predetermined magnitude of the size, means electrically responsive to both said continuously and electrically responsive means and to said pre-setting means so that a size classifying indication is produced and stored if the size of the article differs from the pre-set magnitude in a predetermined direction during the portion of the classifying cycle controlled by said sequencing means, and a second sequencing means for electrically removing said stored classifying indication before the next classifying cycle begins thereby to reset the apparatus, said means which is continuously and electrically responsive to the relative position of the two parts of said engaging means comprises an electrical impedance bridge circuit in which the impedance of at least one arm is responsive to the size of the article being gaged, and the continuously adjusting means for electrically pre-setting a predetermined magnitude of the size comprises means for producing a voltage signal opposite to that produced by the size of the article so that the sum of the two voltages will be substantially zero when the size of the article has a predetermined magnitude, and said means which is electrically responsive to both said continuously and electrically responsive means and to said pre-setting means comprises relay means actuated by the said sum of the two voltages, said relay means remaining actuated until re-set by the action of said second sequencing means.

12. The combination set forth in claim 11 further characterized in that two continuously adjustable means are provided for electrically presetting different predetermined sizes, one being a high limit and the other a low limit, and means electrically responsive to both of said pre-setting means and to said continuously and electrically responsive means so that one classifying indication is produced and stored if the size of the article being gaged exceeds the higher pre-set value and another classifying indication is produced and stored if the size of the article being gaged is smaller than the lower pre-set value.

13. The combination set forth in claim 11 further characterized in that the continuously adjustable means comprises two separately adjustable means, one for pre-setting the nominal value of the size of the article being gaged, and the second for pre-setting the difference between said nominal value and the predetermined magnitude to be used for classifying.

14. The combination set forth in claim 11 further characterized in that three additional continuously adjustable pre-setting means are provided, one for setting a nominal value somewhere between the high and low limits and the other two for setting differences between the nominal value and the respective limits.

15. The combination set forth in claim 11 further characterized in that there is provided a multiplicity of continuously adjustable pre-setting means, and a multiplicity of means electrically responsive to both said continuously and electrically responsive means and to said pre-setting means so that corresponding classifying indications are produced and stored if the condition differs from the respective pre-set magnitudes.

16. The combination set forth in claim 1 further characterized in that the electrical impedance bridge circuit of the means which is continuously and electrically responsive to the condition is energized with A.C. voltage and the impedance of at least one arm of said bridge is responsive to the magnitude of the condition of the article, a phase sensitive detector to receive the sum of the two voltages which constitute the bridge unbalance plus the said opposite voltage signal of the bridge, a filter network to receive the output from the detector so as to produce D.C. voltage responsive to the sum of the two voltages coming from the bridge and the said opposite voltage signal of the bridge, said produced D.C. voltage having a positive polarity when the condition to be measured differs from the pre-set magnitude in a given direction and a negative polarity when it differs in the opposite direction, a thyratron, a circuit for applying the produced D.C. voltage to the control grid of said thyratron, biasing means connected to the screen grid of said thyratron to control its operating point, and means responsive to the operation of said thyratron when it fires so as to provide and store said classifying information.

References Cited in the file of this patent

UNITED STATES PATENTS

| | | |
|---|---|---|
| 2,057,835 | Karajan et al. | Oct. 20, 1936 |
| 2,312,357 | Odquist | Mar. 2, 1943 |
| 2,568,596 | Ruge | Sept. 18, 1951 |
| 2,570,485 | Reiber | Oct. 9, 1951 |
| 2,654,057 | Rivenburg | Sept. 29, 1953 |

OTHER REFERENCES

"American Machinist," December 10, 1931, pp. 887–888.